United States Patent
Fu

(10) Patent No.: US 7,930,534 B2
(45) Date of Patent: Apr. 19, 2011

(54) MOTHERBOARD AND START-UP METHOD UTILIZING A BIOS BIN FILE AND GPIO PINS

(75) Inventor: Chang-Wen Fu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 753 days.

(21) Appl. No.: 11/941,978

(22) Filed: Nov. 19, 2007

(65) Prior Publication Data
US 2009/0089571 A1    Apr. 2, 2009

(30) Foreign Application Priority Data
Sep. 27, 2007   (CN) .......................... 2007 1 0201875

(51) Int. Cl.
*G06F 9/00*    (2006.01)
*G06F 9/24*    (2006.01)
*G06F 1/24*    (2006.01)
(52) U.S. Cl. ................. 713/2; 713/1; 713/100
(58) Field of Classification Search .................. 713/2
See application file for complete search history.

(56) References Cited

U.S. PATENT DOCUMENTS

| | | | |
|---|---|---|---|
| 6,173,398 B1 * | 1/2001 | Kim .................................. | 713/2 |
| 6,425,079 B1 * | 7/2002 | Mahmoud ......................... | 713/2 |
| 7,334,738 B2 * | 2/2008 | Chang ........................... | 235/492 |
| 7,343,516 B2 * | 3/2008 | Broyles ........................... | 714/14 |
| 7,711,945 B2 * | 5/2010 | Shih ................................. | 713/2 |
| 2007/0056017 A1 * | 3/2007 | Takatori ........................ | 725/151 |

FOREIGN PATENT DOCUMENTS
CN      1904829 A     1/2007

* cited by examiner

*Primary Examiner* — Suresh K Suryawanshi
(74) *Attorney, Agent, or Firm* — Frank R. Niranjan

(57) ABSTRACT

A motherboard comprises a first unit which includes most components that are common in a group of motherboards which have a same chip set, a second unit which includes components that are different in the group of motherboards, and a BIOS Bin file which is loaded in the first unit. The BIOS Bin file comprises a share module, a loading module unit which includes a plurality of loading modules each corresponding to one type of motherboard, and a startup module which identifies the type of the motherboard according to a voltage of pre-selected GPIO Pins, and reads one of the loading modules corresponding to that type of motherboard to identify and initiate the second unit, and reads the share module to identify and initiate the first unit.

3 Claims, 2 Drawing Sheets

MOTHERBOARD AND START-UP METHOD UTILIZING A BIOS BIN FILE AND GPIO PINS

BACKGROUND

1. Field of the Invention

The present invention relates to a motherboard and a start-up method thereof.

2. Description of Related Art

BIOS in computing, stands for Basic Input/Output System. BIOS refers to the firmware code run by a personal computer when first powered on. When a computer is turned on, the BIOS does several things, such as: checking the CMOS Setup for custom settings; loading the interrupt handlers and device drives; initiating registers and power management; performing the power-on self-test (POST); displaying system settings; determining which devices are bootable; initiating the bootstrap sequence.

Motherboards often require an unique BIOS. If a motherboard has a BIOS file, which is not matched with it, the computer cannot start up. Therefore, a variety of motherboards may require a variety of BIOS which can be time consuming and costly in the design and manufacturing process.

What is needed, therefore, is a motherboard and a method for starting up the motherboard which can solve the above mentioned problems.

SUMMARY

An embodiment of a motherboard comprises a first unit which includes most components that are common in a group of motherboards which have a same chip set, a second unit which includes components that are different in the group of motherboards, and a BIOS Bin file which is loaded in the first unit. The BIOS Bin file comprises a share module, a loading module unit which includes a plurality of loading modules each corresponding to one type of motherboard, and a startup module which identifies the type of the motherboard according to a voltage of pre-selected GPIO Pins, and reads one of the loading modules corresponding to that type of motherboard to identify and initiate the second unit, and reads the share module to identify and initiate the first unit.

Other advantages and novel features will become more apparent from the following detailed description when taken in conjunction with the accompanying drawings, in which:

DETAILED DESCRIPTION

Figure 1:
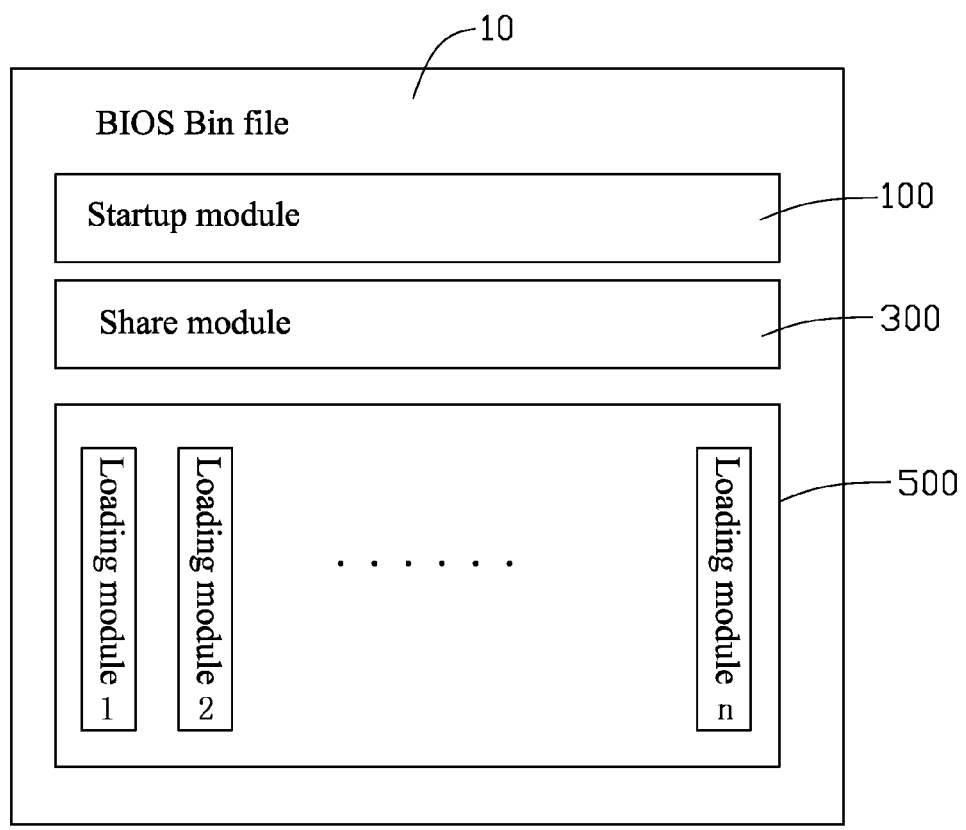
FIG. 1 is a block diagram of a BIOS Bin file of a motherboard in accordance with an embodiment of the present invention.

Referring to FIG. 1, a motherboard in accordance with an embodiment of the present invention includes a first unit including most components that are common in a group of motherboards which have a same chip set, a second unit including components that are different among the group of motherboards, and a BIOS Bin file 10. Components in the first unit are often the most important or necessary components, which include a ROM chip and a system chip. Components in the second unit are often the expansion components, which perform expansion functions. The BIOS Bin file 10 is loaded in the ROM chip.

A Southbridge chip which belongs to the system chip includes a plurality of General Purpose Input/Output (GPIO) Pins, and the GPIO pins input and output a group of control signals. In this embodiment, the BIOS can detect the voltage of pre-selected pins (pins of the Southbridge chip not needed for other functions) to distinguish the type of the motherboard. The voltage of the pre-selected pins can be set manually. When a pin is idle, it is "0"; when a pin is connected to a power of the motherboard, it is "1". For example, when there are four different kinds of motherboards, two pins are all that is needed to identify the different kinds, with "00" assigned as a first motherboard, "01" assigned as a second motherboard, "10" assigned as a third motherboard, "11" assigned as a fourth motherboard.

The BIOS Bin file includes a startup module 100, a share module 300, and a loading module unit 500. The loading module unit 500 comprises a plurality of loading modules, and each loading module corresponds to one type of motherboard. The startup module 100 distinguishes the type of the motherboard according to the voltage of the pre-selected GPIO Pins, and reads the share module 300 and the loading module that belongs to that type of motherboard. The share module 300 identifies and initiates the first unit of the motherboard. The corresponding loading module identifies and initiates the second unit of that type of motherboard.

Figure 2:
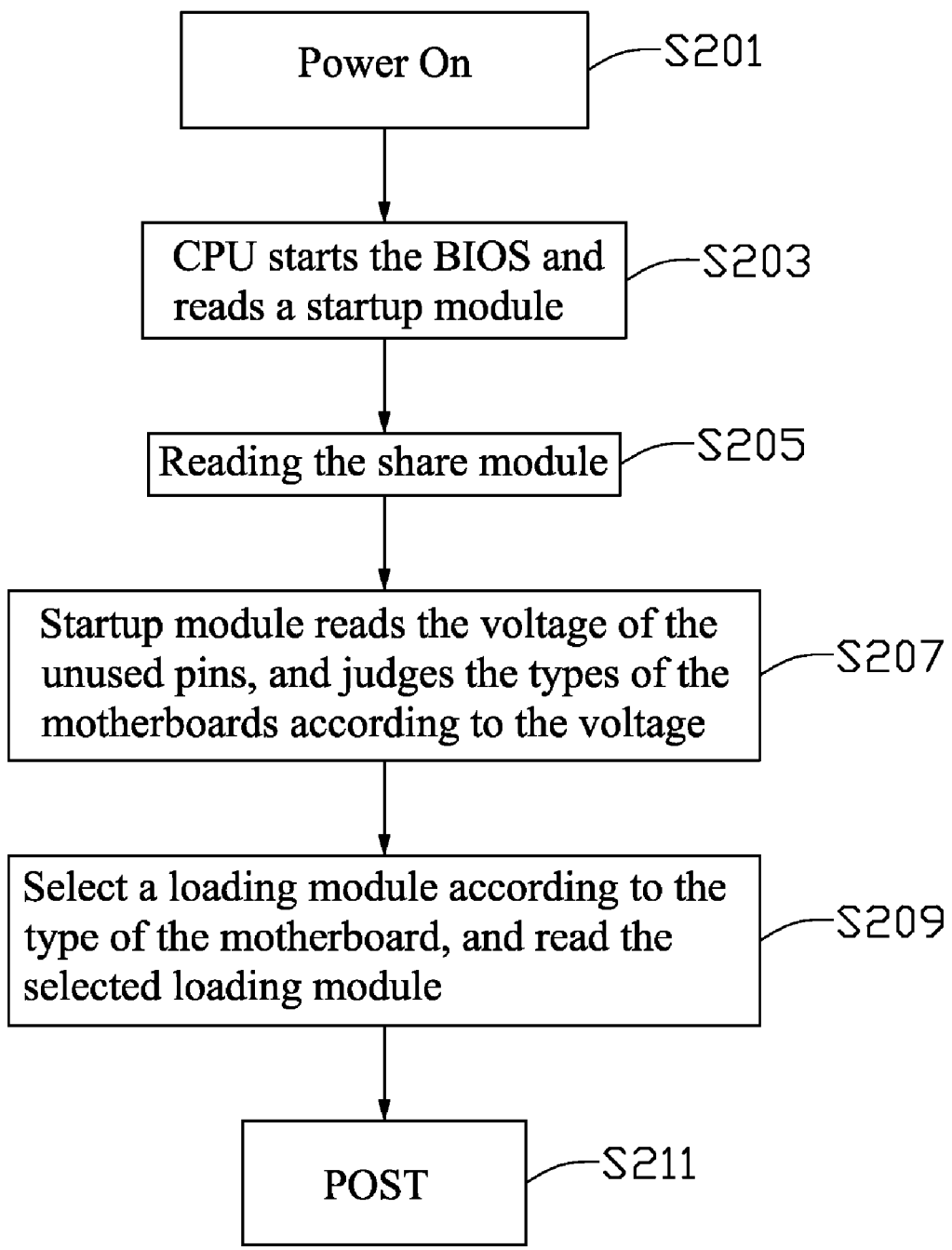
FIG. 2 is a flow chart of starting up a computer with the motherboard of FIG. 1.

Referring to FIG. 2, a method of starting up the computer with the motherboard in accordance with an embodiment of the present invention includes:

Step 201: powering on the motherboard;

Step 203: starting the System BIOS file by a CPU, and reading the startup module 100 by the System BIOS file;

Step 205: reading the share module 300;

Step 207: reading the voltage of the pre-selected pins by the startup module 100, and identifying the type of the motherboard according the voltage;

Step 209: selecting a loading module according to the type of the motherboard, and reading the selected loading module; and Step 211: executing a POST process.

The BIOS Bin file 10 can be used in different types of motherboards which have the same chip set, thus reducing costs and saving time in the design and manufacturing process.

The foregoing description of the exemplary embodiments of the invention has been presented only for the purposes of illustration and description and is not intended to be exhaustive or to limit the invention to the precise forms disclosed. Many modifications and variations are possible in light of the above teaching. The embodiments were chosen and described in order to explain the principles of the invention and their practical application so as to enable others skilled in the art to utilize the invention and various embodiments and with various modifications as are suited to the particular use contemplated. Alternately embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A motherboard comprising:

a first unit including most components that are common in a group of motherboards which have a same chip set, the first unit comprising a ROM chip and a system chip;

a second unit including components that are different in the group of motherboards and a BIOS Bin file which is loaded in the ROM chip, comprising:

a share module;

a loading module unit including a plurality of loading modules each corresponding to one type of motherboard; and a startup module identifying the type of the motherboard according to a voltage of pre-selected GPIO Pins, and reading one of the loading modules corresponding to that type of motherboard to identify and initiate the second unit, and reading the share module to identify and initiate the first unit.

2. The motherboard as claimed in claim 1, wherein the system chip is a Southbridge chip, the pre-selected GPIO Pins is on the Southbridge chip.

3. A method for starting up a motherboard comprising:

powering on the motherboard;

starting a System BIOS file by a CPU of the motherboard;

reading a startup module by the System BIOS file;

reading a share module to identify and initiate components which are common in motherboards which have a same chip set;

identifying the type of the motherboard according to a voltage of pre-selected GPIO pins by the startup module;

according to the type of the motherboard, selecting a loading module from a group of loading modules which are preset in the motherboard, the group of loading modules corresponding to the motherboards;

reading the selected loading module to identify and initiate components which are different in the motherboards; and executing a power-on self-test process.

* * * * *